United States Patent [19]
Allison

[11] 3,869,140
[45] Mar. 4, 1975

[54] REAR SUSPENSION FOR MOTOR VEHICLES

[75] Inventor: William D. Allison, Grosse Pointe Farms, Mich.

[73] Assignee: Ford Motor Company, Dearborn, Mich.

[22] Filed: Dec. 5, 1972

[21] Appl. No.: 312,421

[52] U.S. Cl. ............................... 280/124 R, 267/41
[51] Int. Cl. ........................................... B60g 11/36
[58] Field of Search............ 280/124 R; 267/41, 28, 267/29, 16, 17, 19

[56] References Cited
UNITED STATES PATENTS

| | | | |
|---|---|---|---|
| 1,404,956 | 1/1922 | Higgins | 267/41 |
| 1,655,323 | 1/1928 | Merriell | 267/41 |
| 2,843,397 | 7/1958 | Bastow | 280/124 R |
| 2,969,230 | 1/1961 | Scheublein | 267/41 |

Primary Examiner—Philip Goodman
Attorney, Agent, or Firm—Clifford L. Sadler; Keith L. Zerschling

[57] ABSTRACT

This disclosure relates to a suspension system constructed to interconnect a vehicle axle and a vehicle chassis frame. In accordance with the preferred embodiment of the invention, four links are provided to define the jounce and rebound wheel path. The links include a pair of upper suspension arms pivotally connected to axle housing brackets and to frame brackets. A pair of lower arms comprise single leaf springs that have their rearward ends pivotally connected to the axle housing and their forward ends pivotally connected to the frame. Guide means connects a mid portion of each leaf spring to the frame. Conventional coil springs support the vehicle body and frame upon the axle. The leaf springs and the guide means combine to provide lateral support for the axle with respect to the frame. The leaf springs and guide means also provide supplemental spring rates in extreme jounce and rebound after a predetermined axle travel.

17 Claims, 4 Drawing Figures

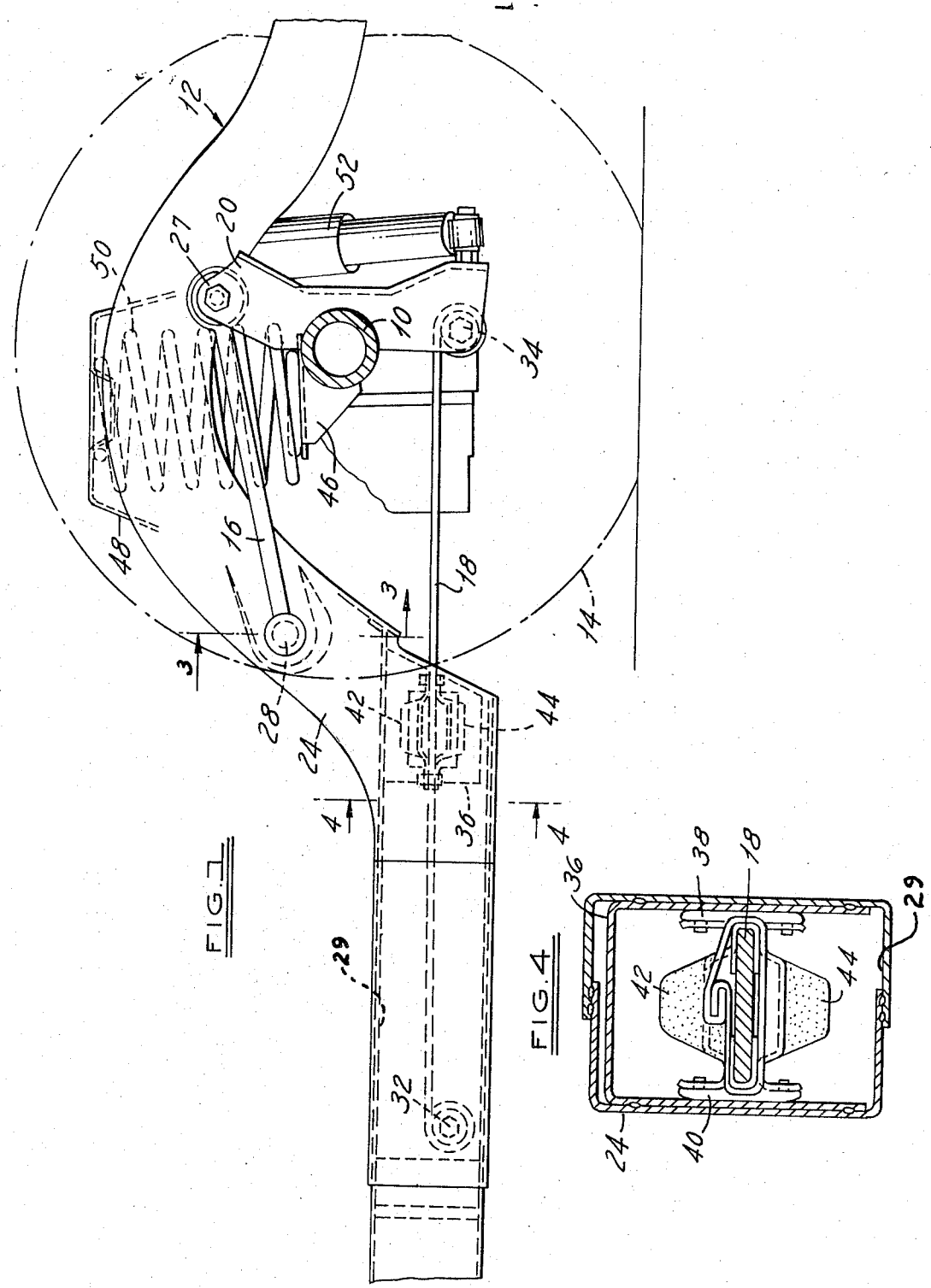

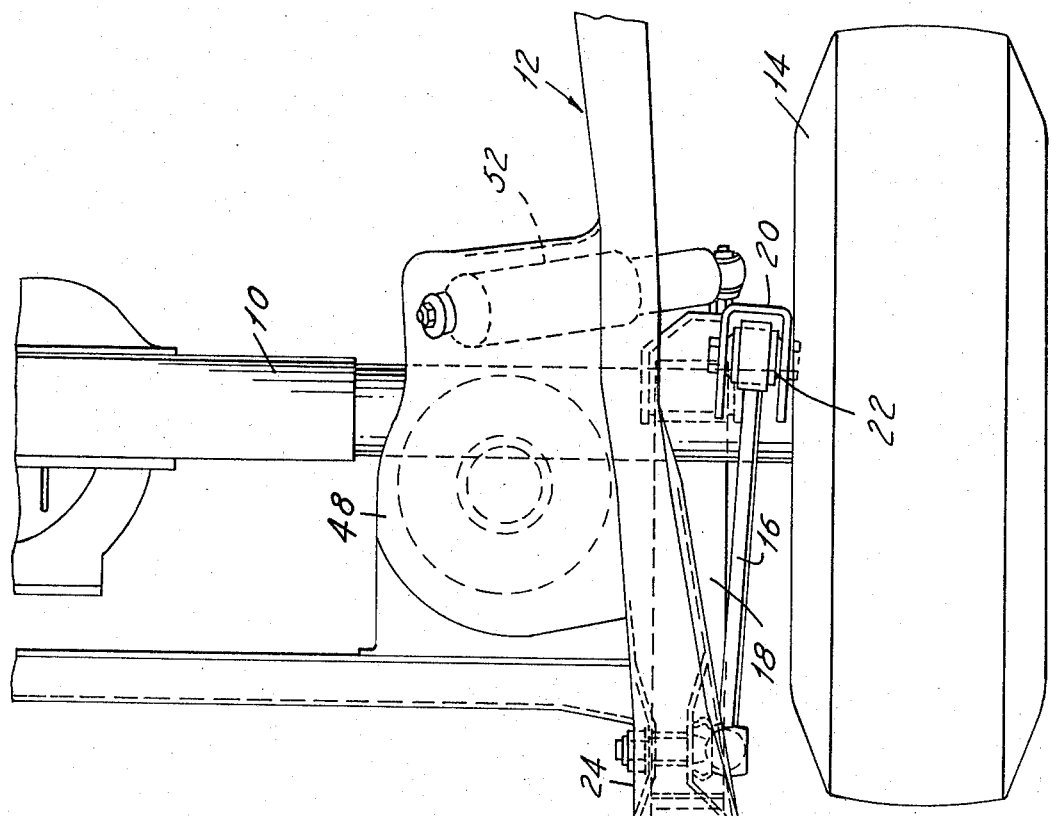
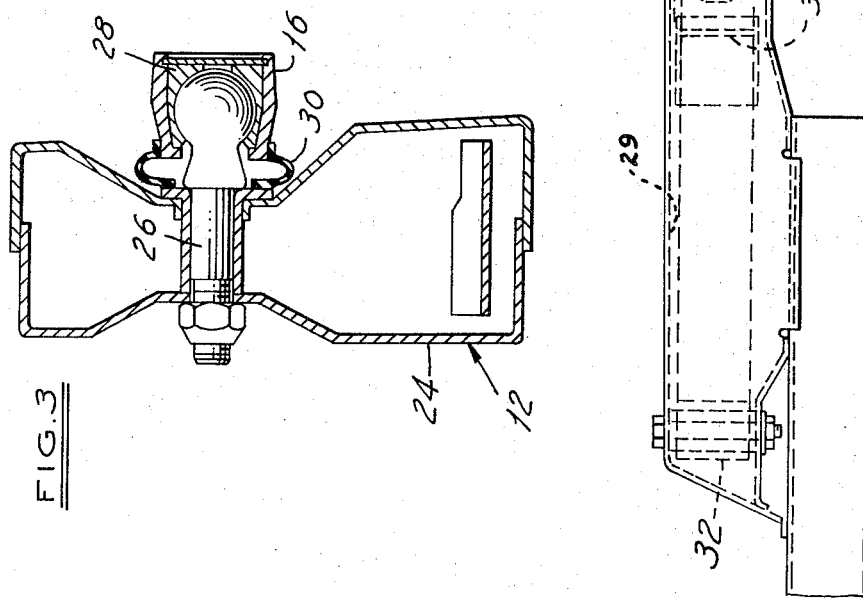
FIG.3
FIG.2

REAR SUSPENSION FOR MOTOR VEHICLES

BACKGROUND OF THE DISCLOSURE

The present invention relates to rear suspension systems, and more particularly to suspension systems of the four link type. Conventionally, such suspensions include four generally longitudinally extending arms and a Panhard rod to provide lateral location of the chassis frame relative to the axle. Other means for locating the frame laterally include Watt linkages and opposed spring rods.

The present invention provides a four link rear suspension with novel means for restraining the suspension against lateral displacement without employing additional rods or links.

BRIEF SUMMARY OF THE DISCLOSURE

In accordance with the presently preferred embodiment of this invention, a four link rear suspension system provides a pair of upper suspension arms and a pair of lower suspension arms. The upper arms are pivotally connected to axle housing brackets and to frame brackets. The lower suspension arms comprise single spring steel blades with high strength in lateral bending and normal flexibility in vertical bending. The spring blades are pivotally connected at their ends to frame brackets and axle housing brackets.

In the illustrated embodiment of the invention, a guide means interconnects a mid portion of each lower suspension arm and the frame. The guide means cooperates with the frame to resist lateral arm movement. The guide means is constructed to permit limited free vertical movement of the arms and a cushioned restraint against excess travel of the arms in jounce and rebound.

The lower suspension arms are fitted in longitudinally extending hollow frame members of box section. The guide means comprise sliding bearing elements fixed to each side of the arms and in rubbing contact with adjacent surfaces of the box section frame. The guide means also include rubber bumpers that engage the internal horizontal surfaces of the box section frame upon extreme jounce and rebound.

Conventional coil springs and a pair of telescopic shock absorbers also form a part of this suspension. The coil springs and shock absorbers interconnect the axle housing and the frame.

A suspension system in accordance with this invention provides control of lateral axle position that is equivalent in function to a resilient Watt linkage but is of more economical construction. The suspension also provides limited lateral compliance for improved traction on cornering and modest compliance understeer.

The restraint at the mid portion of the lower arms provides supplemental spring rates in both extreme jounce and rebound after a predetermined axle travel. The suspension has a high roll rate due to torsional deflection characteristics of the leaf spring lower arms. This high roll rate eliminates any need for a rear suspension roll stabilizer.

BRIEF DESCRIPTION OF THE DRAWINGS

The many objects and advantages of a motor vehicle suspension system constructed in accordance with this invention will become apparent upon consideration of the following detailed description and the accompanying drawings, in which:

FIG. 1 is a side elevational view of a rear suspension system incorporating the presently preferred embodiment of this invention;

FIG. 2 is a top plan view of the left side of the suspension system of FIG. 1;

FIG. 3 is a sectional view taken along section line 3—3 of FIG. 1; and

FIG. 4 is a sectional view taken along section line 4—4 of FIG. 1.

DETAILED DESCRIPTION OF THE PREFERRED EMBODIMENT

Referring now to the drawings, wherein the presently preferred embodiment of this invention is illustrated, FIG. 1 shows a rear suspension system for a motor vehicle that provides an articulated connection between a rear axle 10 and a vehicle chassis frame 12.

In order to simplify the description and promote an understanding of the invention only the left side of the suspension system is shown. The right half of the suspension system is symmetrically constructed and arranged.

The axle housing 10 rotatably supports a pair of rear wheels 14 which are drivingly connected to an axle shaft (not shown) situated within the axle housing 10.

The suspension system includes a pair of upper suspension arms 16 and a pair of lower suspension arms 18. Each upper suspension arm 16 is pivotally connected to the upstanding portion of an axle housing bracket 20. The bracket 20 is welded to the axle housing 10 at its outer end adjacent to the wheel 14. A resilient bushing 22 is provided to connect the rearward end of the upper arm 16 to the bracket 20.

A ball joint connects the forward end of the upper arm 16 to the chassis frame assembly 12. The frame includes a side rail 24 which supports the shank portion of a ball stud 26. The forward end of the upper suspension arm 16 is fitted with a socket 28 that is positioned about the head of the ball stud 26. A boot seal 30 is situated about the open end of the socket 28 in order to keep contaminants out of the ball joint.

The frame rail 24 has a longitudinally extending portion 29 of box section construction (see FIG. 4) with a rearwardly opening rearward end. The forward half of the lower arm 18 extends into the interior of the frame portion 29. The rearward half of the arm 18 is situated exteriorly of the frame.

Each lower suspension arm 18 comprises a single leaf spring blade that has eyes formed at its forward and rearward ends. A resilient bushing 32 pivotally connects the forward end of the lower arm 18 to the forward end of the frame portion 29. The bushing 32 extends between the side walls of the frame portion 29. A resilient bushing 34 connects the rearward end of the lower suspension arm 18 to a depending portion of the axle housing bracket 20.

Means is provided for supporting a mid portion of the suspension arm 18 in the frame rail portion 29. A channel-shape member 36 is fitted within the box section 29 and functions as a reinforcement. A pair of bearing members 38 and 40 are clamped to the mid portion of the suspension arm 18 and are in slidable engagement with the interior wall of the channel-shape reinforcement 36. The members 38 and 40 may be constructed of a plastic bearing material such as nylon or delrin.

Jounce and rebound bumpers 42 and 44 are also clamped to the mid portion of the spring 18. The bumpers 42 and 44 are constructed to engage the upper wall of the channel reinforcement 36 and the lower wall of the frame box section 29, respectively.

The guide means (including the bearing members 38, 40 and the rubber bumpers 42, 44) interposed between the mid portion of the arm 18 and the frame portion 29 supports the arm 18 against lateral displacement. The guide means permits free vertical displacement of the arm for a limited distance. The bumpers 42, 44 resiliently arrest extreme jounce and rebound displacement of the arm 18.

A lower spring seat 46 of sheet metal construction is welded to the axle housing 10. An upper spring seat 48, also of sheet metal construction, forms a part of the chassis frame 10. A coil spring 50 interposed between the spring seats 46 and 48 is constructed to resiliently support the sprung mass of the vehicle chassis upon the unsprung chassis components.

A telescopic shock absorber 52 has its lower end secured to the axle housing bracket 20 adjacent to the attachment of the bushing 34 for the suspension arm 18. The upper end of the shock absorber 52 is connected to the sheet metal which forms the spring seat 48.

OPERATION

When a vehicle having the suspension illustrated in the drawing is operated, the axle housing 10 will traverse a jounce and rebound path as determined by the four links of the suspension system, the four links comprising the two upper arms 16 and the two lower arms 18. The jounce and rebound movement will cause the coil springs 50 and shock absorber 52 to deflect in a conventional fashion.

The chassis frame 12 will be restrained against lateral displacement with respect to the axle housing 10 by reason of the engagement of the bearing members 38 and 40 secured to the suspension arm 18 with the frame rail reinforcement 36. During jounce and rebound movement, the bearings 38 and 40 will slide along the interior surface of the channel reinforcement 36 and will restrain the suspension arm 18 and the axle housing 10 from lateral movement. In some embodiments, bearings 38 and 40 may be constructed to provide limited lateral compliance.

During extreme jounce and rebound movement, the bumpers 42 and 44 will engage the adjacent portion of the box frame portion 29 thereby loading the suspension arm 18 in bending. The suspension arm 18 will then function as a cantilever spring as well as a suspension link. The spring rate of the restrained suspension arm 18 will be combined with the spring rate of the coil spring 50 to retard extreme jounce and rebound deflection.

During body roll, the spring blade which forms the lower suspension arm 18 will be loaded in torsion and this torsional loading will provide an increase in roll rate thereby eliminating the need for a rear suspension roll stabilizer bar.

Thus, a suspension system is provided in accordance with this invention that is characterized by its simplicity of construction in addition to its superior performance capabilities. The suspension provides an increase in spring rate at full jounce and rebound to retard extreme deflection. The invention provides a link type suspension having good lateral control without employing a Panhard rod or other extra control device.

The foregoing description presents the presently preferred embodiment of this invention. Modifications and alterations may occur to those skilled in the art which will come within the scope and spirit of the following claims.

I claim:

1. A suspension system for a motor vehicle having a chassis frame and an axle housing,
   said suspension system including a plurality of suspension links interconnecting said axle housing and said frame,
   at least one of said links comprising a leaf spring,
   pivot means connecting one end of said spring to said frame,
   pivot means connecting the other end of said spring to said axle housing,
   deflection limiting means engaging a portion of said spring intermediate its ends and vertically spaced apart from an adjacent portion of said frame,
   said deflection limiting means being constructed to permit unrestricted vertical movement of said portion of said leaf spring relative to said portion of said frame for a predetermined vertical distance,
   said deflection limiting means being constructed to restrain vertical movement in at least one direction of said portion of said spring relative to said portion of said frame that exceeds a predetermined amount.

2. A suspension system for a motor vehicle according to claim 1 and including:
   said deflection limiting means including resilient means interposed between said spring and said frame and constructed to resiliently arrest said spring against extreme jounce deflection.

3. A suspension system for a motor vehicle according to claim 1 and including:
   said deflection limiting means including resilient means interposed between said spring and said frame and constructed to resiliently arrest said spring against both extreme jounce and rebound deflections.

4. A suspension system for a motor vehicle according to claim 1 and including:
   said deflection limiting means including lateral restraint means constructed to restrain said leaf spring against lateral deflection relative to said frame.

5. A suspension system for a motor vehicle having a chassis frame and an axle housing,
   said suspension system including a plurality of suspension links interconnecting said axle housing and said frame,
   at least one of said links comprising a leaf spring,
   pivot means connecting one end of said spring to said frame,
   pivot means connecting the other end of said spring to said axle housing,
   deflection limiting means engaging said spring at a point intermediate its ends,
   said deflection limiting means being constructed to permit unrestricted vertical movement of said leaf spring relative to said frame for a predetermined vertical distance,
   said deflection limiting means being constructed to restrain vertical movement in at least one direction of said intermediate point of said spring relative to said frame that exceeds a predetermined amount, said deflection limiting means including lateral restraint means constructed to restrain said leaf spring against lateral deflection relative to said frame, said lateral restraint means including bearing means connected to said spring and slidably engaging said frame.

6. A suspension system for a motor vehicle having a chassis frame and an axle housing,
said suspension system including a plurality of suspension links interconnecting said axle housing and said frame,
at least one of said links comprising a leaf spring,
pivot means connecting one end of said spring to said frame,
pivot means connecting the other end of said spring to said axle housing,
deflection limiting means engaging said spring at a point intermediate its ends,
said deflection limiting means being constructed to permit unrestricted vertical movement of said leaf spring relative to said frame for a predetermined vertical distance,
said deflection limiting means being constructed to restrain vertical movement in at least one direction of said intermediate point of said spring relative to said frame that exceeds a predetermined amount,
said deflection limiting means including resilient means interposed between said spring and said frame and constructed to resiliently arrest said spring against extreme jounce deflection,
said deflection limiting means including lateral restraint means constructed to restrain said leaf spring against lateral deflection relative to said frame,
said lateral restraing means including bearing means connected to said spring and slidably engaging said frame.

7. A suspension system for a motor vehicle according to claim 6 and including:
said deflection limiting means being constructed to resiliently arrest said spring against both extreme jounce and rebound deflections.

8. A suspension system for a motor vehicle having a chassis frame and an axle housing,
said suspension system including a plurality of suspension links interconnecting said axle housing and said frame,
at least one of said links comprising a leaf spring,
pivot means connecting one end of said spring to said frame,
pivot means connecting the other end of said spring to said axle housing,
guide means interposed between a mid portion of said spring and said frame,
said guide means being constructed to constrain said spring to displacement along a vertical jounce and rebound path.

9. A suspension system for a motor vehicle having a chassis frame and an axle housing,
said suspension system including a plurality of suspension links interconnecting said axle housing and said frame,
at least one of said links comprising a leaf spring,
pivot means connecting one end of said spring to said frame,
pivot means connecting the other end of said spring to said axle housing,
guide means interposed between a mid portion of said spring and said frame,
said guide means being constructed to constrain said spring to displacement along a vertical jounce and rebound path,
said guide means including bearing means secured to one of said spring mid portion and said frame and slidably engaging the other of said spring mid portion and said frame.

10. A suspension system for a motor vehicle having a chassis frame and an axle housing,
said suspension system including a plurality of suspension links interconnecting said axle housing and said frame,
at least one of said links comprising a leaf spring,
pivot means connecting one end of said spring to said frame,
pivot means connecting the other end of said spring to said axle housing,
guide means interposed between a mid portion of said spring and said frame,
said guide means being constructed to constrain said spring to displacement along a vertical jounce and rebound path,
said frame having a pair of vertically extending support surfaces,
bearing means connected to said mid portion of said spring and engaging said support surfaces.

11. A motor vehicle having a frame, an axle housing and suspension means interconnecting said frame and said axle housing,
said suspension means comprising a pair of upper suspension arms and a pair of lower suspension arms,
said suspension arms being pivotally connected to said frame and said axle housing,
main suspension spring means operatively interposed between said frame and said axle housing,
one of said pair of suspension arms comprising leaf spring members,
guide means interposed between said frame and said leaf spring members,
said guide means being constructed to constrain displacement of said leaf spring members to a vertical jounce and rebound path,
deflection limiting means engaging said leaf spring members and constructed to limit the extent of the vertical displacement of the portion of said leaf spring members engaged by said deflection limiting means,
said guide means being constructed to support said leaf spring members and said axle housing against lateral displacement relative to said frame.

12. A suspension system for a motor vehicle according to claim 11 and including:
said guide means including bearing means connected to said spring members and slidably engaging said frame.

13. A suspension system for a motor vehicle according to claim 11 and including:
said deflection limiting means including resilient means interposed between said spring members and said frame and constructed to resiliently arrest said spring against extreme jounce deflection.

14. A suspension system for a motor vehicle according to claim 11 and including:
said deflection limiting means including resilient means interposed between said spring members and said frame and constructed to resiliently arrest said spring against both extreme jounce and rebound deflections,
said lateral restraint means including bearing means connected to said spring members and slidably engaging said frame.

15. A motor vehicle having a frame, an axle housing and suspension means interconnecting said frame and said axle housing,
said suspension means comprising a pair of upper and a pair of lower suspension arms,
said suspension arms being pivotally connected to said frame and said axle housing,
main suspension spring means operatively interposed between said frame and said axle housing,
one of said pair of suspension arms comprising leaf spring members,
said frame having a pair of rearwardly open, longitudinally extending, box section members,
the forward half of said spring members being disposed within said frame members,
support means interposed between said frame members and a mid portion of said leaf spring members,
said support means being constructed to constrain displacement of said leaf spring members to a vertical jounce and rebound path,
said support means being constructed to limit the extent of the vertical displacement of said mid portion of said leaf spring members with respect to said frame members.

16. A suspension system for a motor vehicle having a chassis frame structure and an axle housing,
said frame structure including left and right frame portions,
each of said left and right frame portions having vertical sidewalls and a top wall,
said suspension system including a plurality of suspension links interconnecting said axle housing and said frame structure,
said links including left and right leaf springs,
pivot means connecting the forward ends of said springs to said frame structure,
pivot means connecting the rearward ends of said springs to said axle housing,
said left and right springs each having an intermediate portion adjacent to and spaced apart from said walls of said left and right frame portions,
load bearing means interposed between said intermediate portions of said springs and said walls of said frame portion,
said load bearing means being constructed to resist lateral displacement of said springs with respect to said frame structure,
said suspension system being constructed to load said left and right leaf springs in torsion upon angular displacement of said frame structure about a longitudinal roll axis relative to said axle housing.

17. A suspension system for a motor vehicle having a chassis frame structure and an axle housing,
said frame structure including left and right frame portions,
each of said left and right frame portions having longitudinally extending vertical sidewalls and a longitudinally extending top wall,
said suspension system including a plurality of suspension links interconnecting said axle housing and said frame structure,
said links including left and right leaf springs,
pivot means connecting the forward ends of said springs to said vertical sidewalls,
pivot means connecting the rearward ends of said springs to said axle housing,
said left and right springs each having an intermediate portion adjacent to and spaced apart from said walls of said left and right frame portions,
load bearing means interposed between said intermediate portions of said springs and said walls of said frame portion,
said load bearing means being constructed to resist lateral displacement of said springs with respect to said frame structure,
said suspension system being constructed to load said left and right leaf springs in torsion upon angular displacement of said frame structure about a longitudinal roll axis relative to said axle housing.

* * * * *